United States Patent
Furukawa et al.

(10) Patent No.: US 11,933,197 B2
(45) Date of Patent: Mar. 19, 2024

(54) COMBINED CYCLE PLANT, METHOD FOR STARTING UP SAME, AND START-UP CONTROL PROGRAM FOR EXECUTING SAID METHOD

(71) Applicant: MITSUBISHI HEAVY INDUSTRIES, LTD., Tokyo (JP)

(72) Inventors: Yuichiro Furukawa, Yokohama (JP); Masataka Naruse, Tokyo (JP); Kazuhiko Maruta, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/027,290

(22) PCT Filed: Sep. 16, 2021

(86) PCT No.: PCT/JP2021/034142
§ 371 (c)(1),
(2) Date: Mar. 20, 2023

(87) PCT Pub. No.: WO2022/070960
PCT Pub. Date: Apr. 7, 2022

(65) Prior Publication Data
US 2023/0374920 A1    Nov. 23, 2023

(30) Foreign Application Priority Data
Sep. 30, 2020  (JP) .................. 2020-164685

(51) Int. Cl.
*F01K 23/10* (2006.01)
*F01K 13/02* (2006.01)

(52) U.S. Cl.
CPC ............ *F01K 23/101* (2013.01); *F01K 13/02* (2013.01); *F05D 2220/722* (2013.01); *F05D 2260/85* (2013.01); *F05D 2270/301* (2013.01)

(58) Field of Classification Search
CPC ........ F01K 23/00; F01K 23/101; F01K 23/10; F01K 23/02; F05D 2220/722;
(Continued)

(56) References Cited

U.S. PATENT DOCUMENTS 4,455,614 A * 6/1984 Martz ..................... F01K 23/10
                                                   290/40 R
2014/0373540 A1* 12/2014 Kim ....................... F01K 23/101
                                                      60/660
(Continued)

FOREIGN PATENT DOCUMENTS

JP    54-158502    12/1979
JP    58-197408    11/1983
(Continued)

OTHER PUBLICATIONS

International Search Report dated Nov. 16, 2021 in International Application No. PCT/JP2021/034142.
(Continued)

*Primary Examiner* — Steven M Sutherland
(74) *Attorney, Agent, or Firm* — Wenderoth, Lind & Ponack, L.L.P.

(57) ABSTRACT

A method for starting up a combined cycle plant in which the following steps are executed: a gas turbine start-up step of increasing an output of a gas turbine to a rated output, a steam admission step of starting steam supply to a steam turbine when a temperature of the steam from a waste heat recovery boiler reaches or exceeds a predetermined temperature, and an ST generator output control step of controlling a flow rate of steam flowing into the steam turbine after a generator is synchronized so that an output of the generator increases according to a target output change pattern. In the ST generator output control step, when a thermal stress reaches or exceeds a predetermined first thermal stress, the flow rate of the steam is controlled so that (Continued)

the change in the generator output is smaller than a change indicated by the target output change pattern.

16 Claims, 6 Drawing Sheets

(58) Field of Classification Search
CPC .. F05D 2260/85; F05D 2270/301; F02C 9/00; F02C 9/16
See application file for complete search history.

(56) References Cited

U.S. PATENT DOCUMENTS

| | | |
|---|---|---|
| 2015/0176437 A1 | 6/2015 | Tobo et al. |
| 2018/0298779 A1 | 10/2018 | Kubota |

FOREIGN PATENT DOCUMENTS

| | | |
|---|---|---|
| JP | 3-70804 | 3/1991 |
| JP | 3-199601 | 8/1991 |
| JP | 8-128304 | 5/1996 |
| JP | 2000-130108 | 5/2000 |
| JP | 2005-232966 | 9/2005 |
| JP | 2016-2053 13 | 12/2016 |
| JP | 6352762 | 7/2018 |
| JP | 6628554 | 1/2020 |
| JP | 2020-84947 | 6/2020 |

OTHER PUBLICATIONS

Written Opinion of the International Searching Authority dated Nov. 16, 2021 in International Application No. PCT/JP2021/034142.

\* cited by examiner

COMBINED CYCLE PLANT, METHOD FOR STARTING UP SAME, AND START-UP CONTROL PROGRAM FOR EXECUTING SAID METHOD

TECHNICAL FIELD

The present disclosure relates to a combined cycle plant including a gas turbine, a waste heat recovery boiler, and a steam turbine, a method for starting up the same, and a start-up control program for executing the method.

This application claims priority based on Japanese Patent Application No. 2020-164685 filed in Japan on Sep. 30, 2020, the contents of which are incorporated herein by reference.

BACKGROUND ART

A combined cycle plant includes a gas turbine driven by fuel supply, a GT generator that generates electricity by the gas turbine drive, a waste heat recovery boiler that generates steam by using heat from exhaust gas exhausted from the gas turbine, a steam turbine driven by the steam from the waste heat recovery boiler, a condenser that returns the steam exhausted from the steam turbine to water, and an ST generator that generates electricity by drive of the steam turbine.

As a method for starting up the combined cycle plant, for example, there is a method disclosed in Patent Document 1 below. In this method for starting up, the gas turbine is first started, and after the rotational speed of the gas turbine reaches the rated rotational speed, the GT generator connected to the gas turbine is synchronized to the power system. Subsequently, when the gas turbine output (output of the GT generator) reaches the initial output, the amount of fuel to be supplied to the gas turbine is adjusted so that the initial output is maintained for a certain period of time. Subsequently, when the temperature of steam from the waste heat recovery boiler reaches or exceeds a predetermined temperature, the steam from the waste heat recovery boiler is gradually supplied to the steam turbine. Note that the predetermined temperature here is a temperature that is set as appropriate for starting up the steam turbine. Then, after the rotational speed of the steam turbine reaches the rated rotational speed, the ST generator connected to the steam turbine is synchronized to the power system. Subsequently, the amount of fuel to be supplied to the gas turbine is gradually increased to bring the gas turbine output to the rated output. In this process, the flow rate of the steam from the waste heat recovery boiler increases and the temperature of the steam also increases, so the steam turbine output also reaches the rated output.

When the gas turbine output is rapidly increased to the rated output, high temperature steam flows into the cooled steam turbine, thereby generating high thermal stress in the steam turbine. Thus, in the method for starting up, from the viewpoint of protecting the steam turbine, the gas turbine output is once maintained at the initial output lower than the rated output, and then increased to the rated output.

CITATION LIST

Patent Literature

Patent Document 1: JP 58-197408 A

SUMMARY OF INVENTION

Technical Problem

In the power generation industry, there is a demand for shortening the time from the start-up of the gas turbine until the gas turbine output reaches the rated output as much as possible.

Accordingly, an object of the present disclosure is to provide a technique capable of increasing the gas turbine output to the rated output in a short period of time while suppressing the thermal stress generated in the steam turbine.

Solution to Problem

A method for starting up a combined cycle plant as an aspect for achieving the above object is applied to the following combined cycle plant.

The combined cycle plant includes a gas turbine configured to be driven by fuel supply, a waste heat recovery boiler configured to generate steam by using heat from exhaust gas exhausted from the gas turbine, a steam turbine configured to be driven by the steam from the waste heat recovery boiler, a condenser configured to return the steam exhausted from the steam turbine to water, and a generator configured to generate electricity by drive of the steam turbine.

The method for starting up the combined cycle plant includes a gas turbine start-up step of increasing an output of the gas turbine to a rated output by supplying fuel to the gas turbine, a steam admission step of, when a temperature of the steam from the waste heat recovery boiler reaches or exceeds a predetermined temperature, starting steam supply to the steam turbine, a synchronization step of, after the steam admission step, when a rotational speed of the steam turbine reaches a rated rotational speed, synchronizing the generator to a power system, an ST generator output control step of, after the generator is synchronized, controlling a flow rate of the steam flowing into the steam turbine so that an output of the generator increases according to a target output change pattern, and a thermal stress estimation step of estimating a thermal stress generated in the steam turbine based on a temperature of the steam flowing into the steam turbine. In the ST generator output control step, when the thermal stress estimated in the thermal stress estimation step reaches or exceeds a predetermined first thermal stress, the flow rate of the steam flowing into the steam turbine is controlled so that a change in the output of the generator is smaller than a change indicated by the target output change pattern.

An amount of steam supplied to the steam turbine per unit time has a positive correlation with a steam turbine output that is the output of the generator. In addition, the thermal stress in the steam turbine has a positive correlation with the steam turbine output for a predetermined time after the generator connected to the steam turbine is synchronized to the power system. Thus, in this aspect, the flow rate of the steam flowing into the steam turbine is controlled based on the steam turbine output so that the thermal stress generated in the steam turbine does not reach or exceed the predetermined thermal stress. Therefore, in this aspect, there is no need to maintain the gas turbine output at a low output lower than the rated output for a predetermined time to prevent the thermal stress generated in the steam turbine from becoming too high.

Thus, in this aspect, the time required for the gas turbine output to reach the rated output can be shorter than when the gas turbine output is maintained at the low output for the predetermined time, while suppressing the thermal stress generated in the steam turbine.

A combined cycle plant according to an aspect for achieving the object includes a gas turbine configured to be driven by fuel supply, a waste heat recovery boiler configured to generate steam by using heat from exhaust gas exhausted from the gas turbine, a steam turbine configured to be driven by the steam from the waste heat recovery boiler, a condenser configured to return the steam exhausted from the steam turbine to water, a generator configured to generate electricity by drive of the steam turbine, a circuit breaker configured to electrically connect the generator to a power system in response to an external command and to electrically disconnect the generator from the power system in response to an external command, a fuel control valve configured to adjust a flow rate of fuel to be supplied to the gas turbine, a main steam line configured to guide the steam from the waste heat recovery boiler to the steam turbine, a steam control valve provided in the main steam line and configured to adjust a flow rate of the steam flowing into the steam turbine, a thermometer provided in the main steam line closer to the waste heat recovery boiler than the steam control valve and configured to detect a temperature of the steam flowing through the main steam line, a rotational speed meter configured to detect a rotational speed of the steam turbine, an output gauge configured to detect an output that is an amount of power generated by the generator, and a control device. The control device includes a start-up fuel control unit configured to command the fuel control valve to start fuel supply to the gas turbine and command the fuel control valve on a flow rate of fuel to be supplied to the gas turbine so that an output of the gas turbine increases to a rated output, a steam admission command unit configured to command the steam control valve to open so as to start steam supply to the steam turbine when the temperature of the steam detected by the thermometer reaches or exceeds a predetermined temperature, a synchronization command unit configured to command the circuit breaker to electrically connect the generator to the power system when the rotational speed detected by the rotational speed meter reaches a rated rotational speed of the steam turbine, an ST generator output control unit configured to command the steam control valve on a flow rate of the steam to flow into the steam turbine after the generator is electrically connected to the power system so that the output detected by the output gauge increases according to a target output change pattern, and a thermal stress estimating unit configured to estimate thermal stress generated in the steam turbine based on the temperature of the steam detected by the thermometer. When the thermal stress estimated by the thermal stress estimating unit reaches or exceeds a predetermined value, the ST generator output control unit commands the steam control valve on the flow rate of the steam to flow into the steam turbine so that the change in the output detected by the output gauge is smaller than a change indicated by the target output change pattern.

A start-up control program for a combined cycle plant as an aspect for achieving the above object is applied to the following combined cycle plant.

The combined cycle plant includes a gas turbine configured to be driven by fuel supply, a waste heat recovery boiler configured to generate steam by using heat from exhaust gas exhausted from the gas turbine, a steam turbine configured to be driven by the steam from the waste heat recovery boiler, a condenser configured to return the steam exhausted from the steam turbine to water, a generator configured to generate electricity by drive of the steam turbine, a circuit breaker configured to electrically connect the generator to a power system in response to an external command and to electrically disconnect the generator from the power system in response to an external command, a fuel control valve configured to adjust a flow rate of fuel to be supplied to the gas turbine, a main steam line configured to guide the steam from the waste heat recovery boiler to the steam turbine, a steam control valve provided in the main steam line and configured to adjust a flow rate of the steam flowing into the steam turbine, a thermometer provided in the main steam line closer to the waste heat recovery boiler than the steam control valve and configured to detect a temperature of the steam flowing through the main steam line, a rotational speed meter configured to detect a rotational speed of the steam turbine, an output gauge configured to detect an output that is an amount of power generated by the generator.

The start-up control program for the combined cycle plant causes a computer to execute a gas turbine start-up step of commanding the fuel to start fuel supply to the gas turbine and commanding the fuel control valve on a flow rate of fuel to be supplied to the gas turbine so that the output of the gas turbine increases to a rated output, a steam admission command step of, when the temperature of the steam detected by the thermometer reaches or exceeds a predetermined temperature, commanding the steam control valve to open so as to start steam supply to the steam turbine, a synchronization step of, when the rotational speed detected by the rotational speed meter reaches a rated rotational speed of the steam turbine, commanding the circuit breaker to electrically connect the generator to the power system, an ST generator output control step of, after the generator is electrically connected to the power system, commanding the steam control valve on a flow rate of the steam to flow into the steam turbine so that the output detected by the output gauge increases according to a target output change pattern, and a thermal stress estimation step of estimating thermal stress generated in the steam turbine based on the temperature of the steam detected by the thermometer. In the ST generator output control step, when the thermal stress estimated in the thermal stress estimation step reaches or exceeds a predetermined value, the flow rate of the steam to flow into the steam turbine is commanded to the steam control valve so that a change in the output detected by the output gauge is smaller than a change indicated by the target output change pattern.

Advantageous Effects of Invention

According to one aspect of the present disclosure, the gas turbine output can be brought to the rated output in a short period of time while suppressing the thermal stress generated in the steam turbine.

DESCRIPTION OF EMBODIMENTS

Hereinafter, embodiments related to a combined cycle plant and a method for starting up the combined cycle plant according to the present disclosure will be described.

First Embodiment

The present embodiment will be described with reference to FIGS. 1 to 5.

Figure 1:
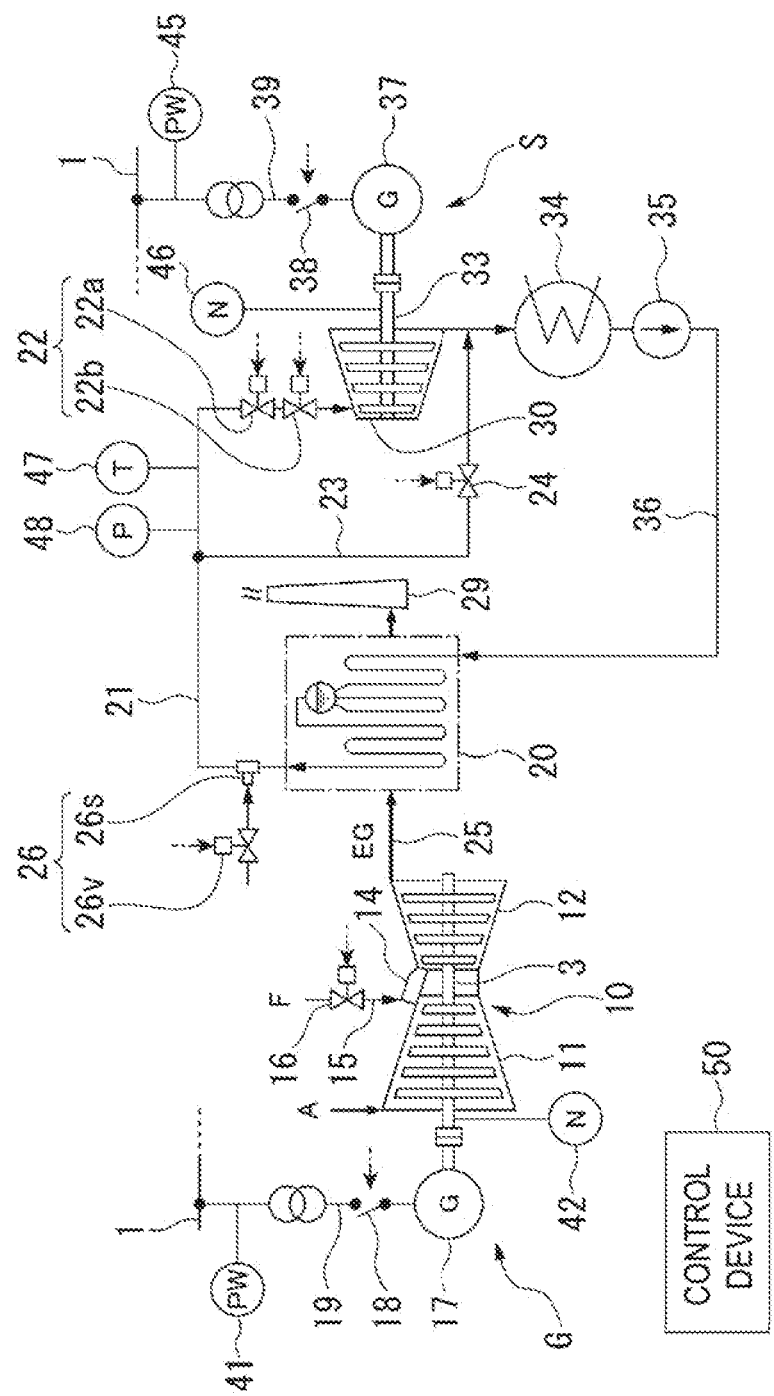
FIG. 1 is a system diagram illustrating a combined cycle plant in a first embodiment according to the present disclosure.
Figure 2:
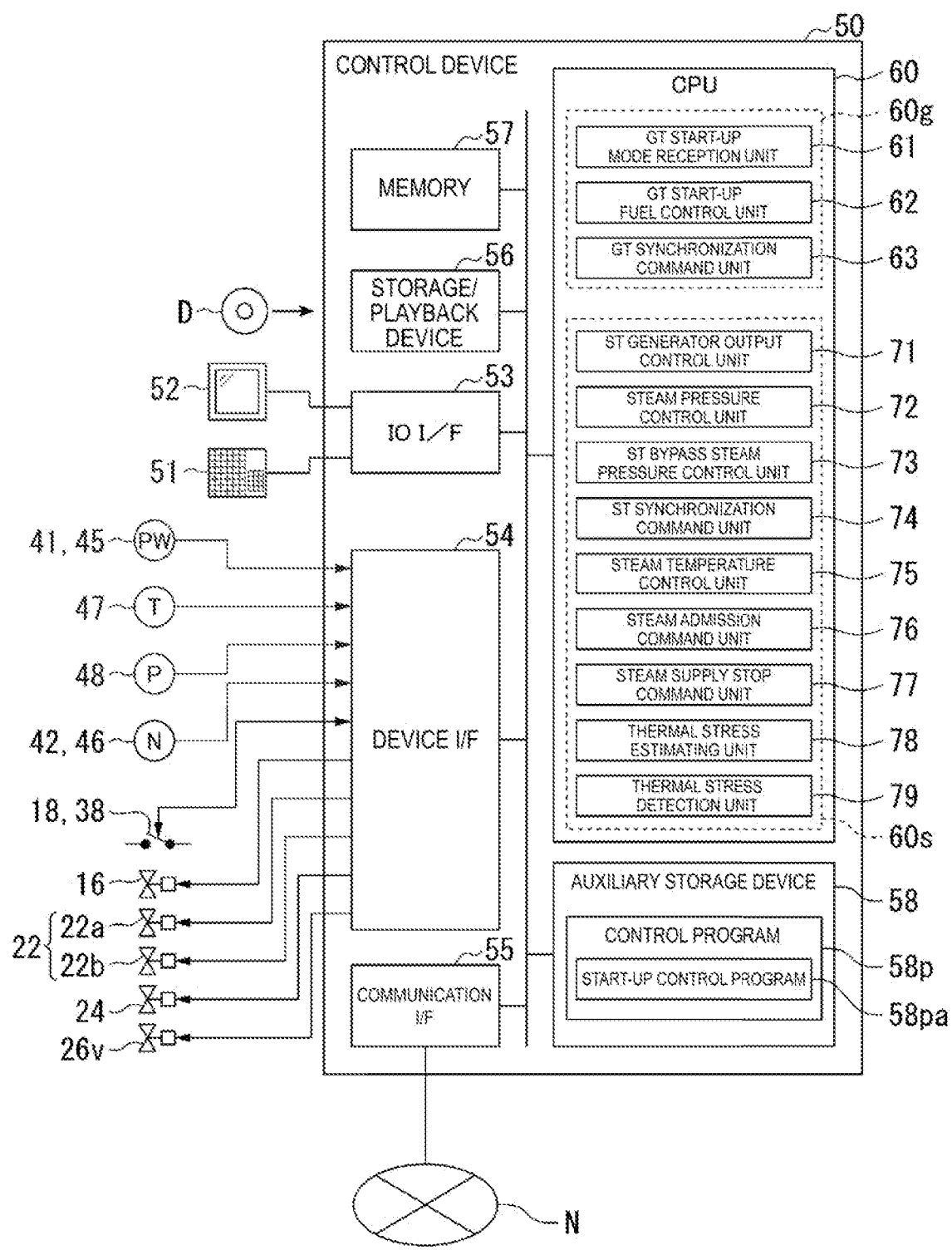
FIG. 2 is an explanatory diagram illustrating a functional configuration of a control device according to the first embodiment of the present disclosure.

As illustrated in FIG. 1, a combined cycle plant of the present embodiment includes a gas turbine installation G, a steam turbine installation S, and a control device 50.

The gas turbine installation G includes a gas turbine 10, a GT generator 17 that generates electricity by the gas turbine 10 drive, a GT circuit breaker 18 that electrically connects and disconnects the GT generator 17 to and from a power system 1, a waste heat recovery boiler 20 that generates steam from heat from exhaust gas EG exhausted from the gas turbine 10, and a stack 29 that discharges the exhaust gas EG that has passed through the waste heat recovery boiler 20 to the atmosphere.

The gas turbine 10 includes a compressor 11 that compresses air A, a combustor 14 that burns fuel F in the air compressed by the compressor 11 to generate combustion gas, and a turbine 12 that is driven by the high-temperature and high-pressure combustion gas. A turbine rotor of the turbine 12 and a compressor rotor of the compressor 11 are connected to each other to form a gas turbine rotor 13. A rotor of the GT generator 17 is connected to the gas turbine rotor 13.

A fuel line 15 is connected to the combustor 14 to supply the fuel F from an external fuel supply source to the combustor 14. The fuel line 15 is provided with a fuel control valve 16 that adjusts a flow rate of the fuel F to be supplied to the combustor 14.

The waste heat recovery boiler 20 is connected to an exhaust port of the turbine 12 via a flue gas duct 25. The stack 29 is provided at an exhaust port of the waste heat recovery boiler 20.

The GT generator 17 is electrically connected to the power system 1 by a power line 19. The power line 19 is provided with the GT circuit breaker 18. The GT circuit breaker 18 electrically connects the GT generator 17 to the power system 1 in response to a command from the outside, and electrically disconnects the GT generator 17 from the power system 1 in response to a command from the outside.

The gas turbine installation G further includes a GT output gauge 41 capable of detecting a gas turbine output, which is the power generated by the GT generator 17, and a GT rotational speed meter 42 capable of detecting the rotational speed of the gas turbine rotor 13.

The steam turbine installation S includes the waste heat recovery boiler 20, the stack 29, a steam turbine 30 driven by the steam generated by the waste heat recovery boiler 20, an ST generator 37 that generates electricity by the steam turbine 30 drive, an ST circuit breaker 38 that electrically connects and disconnects the ST generator 37 to and from the power system 1, a condenser 34 that returns the steam exhausted from the steam turbine 30 to water, and a feedwater pump 35 that returns the water in the condenser 34 to the waste heat recovery boiler 20. Thus, the waste heat recovery boiler 20 and the stack 29 are common devices for the gas turbine installation G and the steam turbine installation S.

A steam turbine rotor 33 is connected to a rotor of the ST generator 37. The steam turbine rotor 33 is not mechanically connected to the gas turbine rotor 13. Therefore, the rotation of the gas turbine rotor 13 is not synchronized with the rotation of the steam turbine rotor 33. Thus, just because the gas turbine rotor 13 is rotating does not necessarily mean that the steam turbine rotor 33 is rotation.

The ST generator 37 is electrically connected to the power system 1 by a power line 39. The power line 39 is provided with the ST circuit breaker 38. The ST circuit breaker 38 electrically connects the ST generator 37 to the power system 1 in response to a command from the outside, and electrically disconnects the ST generator 37 from the power system 1 in response to a command from the outside.

A steam inlet of the steam turbine 30 and a steam outlet of the waste heat recovery boiler 20 are connected by a main steam line 21. The main steam line 21 is provided with a steam control valve 22 that adjusts the flow rate of steam flowing into the steam turbine 30. The steam control valve 22 includes a shut-off valve 22a capable of shutting off the steam flowing into the steam turbine 30 and a control valve 22b capable of adjusting the flow rate of the steam flowing into the steam turbine 30. The control valve 22b is disposed in the main steam line 21 closer to the steam turbine 30 than the shut-off valve 22a.

A steam outlet of the steam turbine 30 is connected to a steam inlet of the condenser 34. A bypass line 23 is branched from a position in the main steam line 21 closer to the waste heat recovery boiler 20 than the steam control valve 22. The bypass line 23 is connected to the steam inlet of the condenser 34. The bypass line 23 is provided with a bypass valve 24 that adjusts a flow rate of steam flowing through the bypass line 23. A feedwater line 36 connects a condensate outlet of the condenser 34 and a water inlet of the waste heat recovery boiler 20. The feedwater pump 35 is provided in the feedwater line 36.

A desuperheater 26 capable of adjusting the temperature of the steam flowing into the steam turbine 30 is provided at a position in the main steam line 21 closer to the waste heat recovery boiler 20 than the branch position of the bypass line 23. The desuperheater 26 includes a spray 26s capable of spraying water at a position in the main steam line 21 closer to the waste heat recovery boiler 20 than the branch position of the bypass line 23, and a spray amount control valve 26v capable of adjusting an amount of water sprayed from the spray 26s.

The steam turbine installation S further includes an ST generator output gauge 45 capable of detecting a steam turbine output, which is the power generated by the ST generator 37, an ST rotational speed meter 46 capable of detecting the rotational speed of the steam turbine rotor 33, a thermometer 47 capable of detecting the temperature of the steam flowing through the main steam line 21, and a pressure gauge 48 capable of detecting the pressure of the steam flowing through the main steam line 21. The thermometer 47 and the pressure gauge 48 are provided at positions in the main steam line 21 closer to the steam turbine 30 than the branch position of the bypass line 23 and closer to the waste heat recovery boiler 20 than the steam control valve 22.

The control device 50 is a computer. The control device 50 includes a central processing unit (CPU) 60 that executes various operations, a memory 57 that serves as a work area for the CPU 60 or the like, an auxiliary storage device 58 such as a hard disk drive device, a manual input device (input device) 51 such as a keyboard or a mouse, a display device (output device) 52, an input/output interface 53 for the manual input device 51 and the display device 52, a device interface (input device) 54 for transmitting and receiving data to and from various devices, a communication interface (input/output device) 55 for communicating with the outside via a network N, and a storage/playback device (input/output device) 56 that executes data storage processing and playback processing for a disk storage medium D. The device interface 54 receives detection data from the GT output gauge 41, the GT rotational speed meter 42, the ST generator output gauge 45, the ST rotational speed meter 46, the thermometer 47, and the pressure gauge 48. The device interface 54 transmits control data to the circuit breakers 18 and 38, the fuel control valve 16, the shut-off valve 22a, the control valve 22b, the bypass valve 24, and the spray amount control valve 26v.

The auxiliary storage device 58 stores in advance a control program 58p for the combined cycle plant. A start-up control program 58pa that controls start-up of the combined cycle plant is incorporated in the control program 58p. The control program 58p is loaded into the auxiliary storage device 58 from the disk storage medium D via the storage/playback device 56, for example. When the control program 58p is already stored in the auxiliary storage device 58 and the start-up control program in the control program 58p is to be updated, a new start-up control program 58pa is loaded into the auxiliary storage device 58 from the disk storage medium D via the storage/playback device 56, for example. Note that the program may be loaded into the auxiliary storage device 58 from an external device via the communication interface 55.

The CPU 60 functionally includes a start-up control unit 60g for the gas turbine installation G and a start-up control unit 60s for the steam turbine installation S. The start-up control unit 60g of the gas turbine installation G includes a GT start-up mode reception unit 61, a GT start-up fuel control unit 62, and a GT synchronization command unit 63. The start-up control unit 60s of the steam turbine installation S includes an ST generator output control unit 71, a steam pressure control unit 72, an ST bypass steam pressure control unit 73, an ST synchronization command unit 74, a steam temperature control unit 75, a steam admission command unit 76, a steam supply stop command unit 77, a thermal stress estimating unit 78, and a thermal stress detection unit 79. All of the functional units 61 to 63 and 71 to 79 function when the CPU 60 executes the start-up control program 58pa stored in the auxiliary storage device 58. The functional contents of the functional units 61 to 63 and 71 to 79 will be described in the process of describing the operation of the control device 50.

Figure 3:
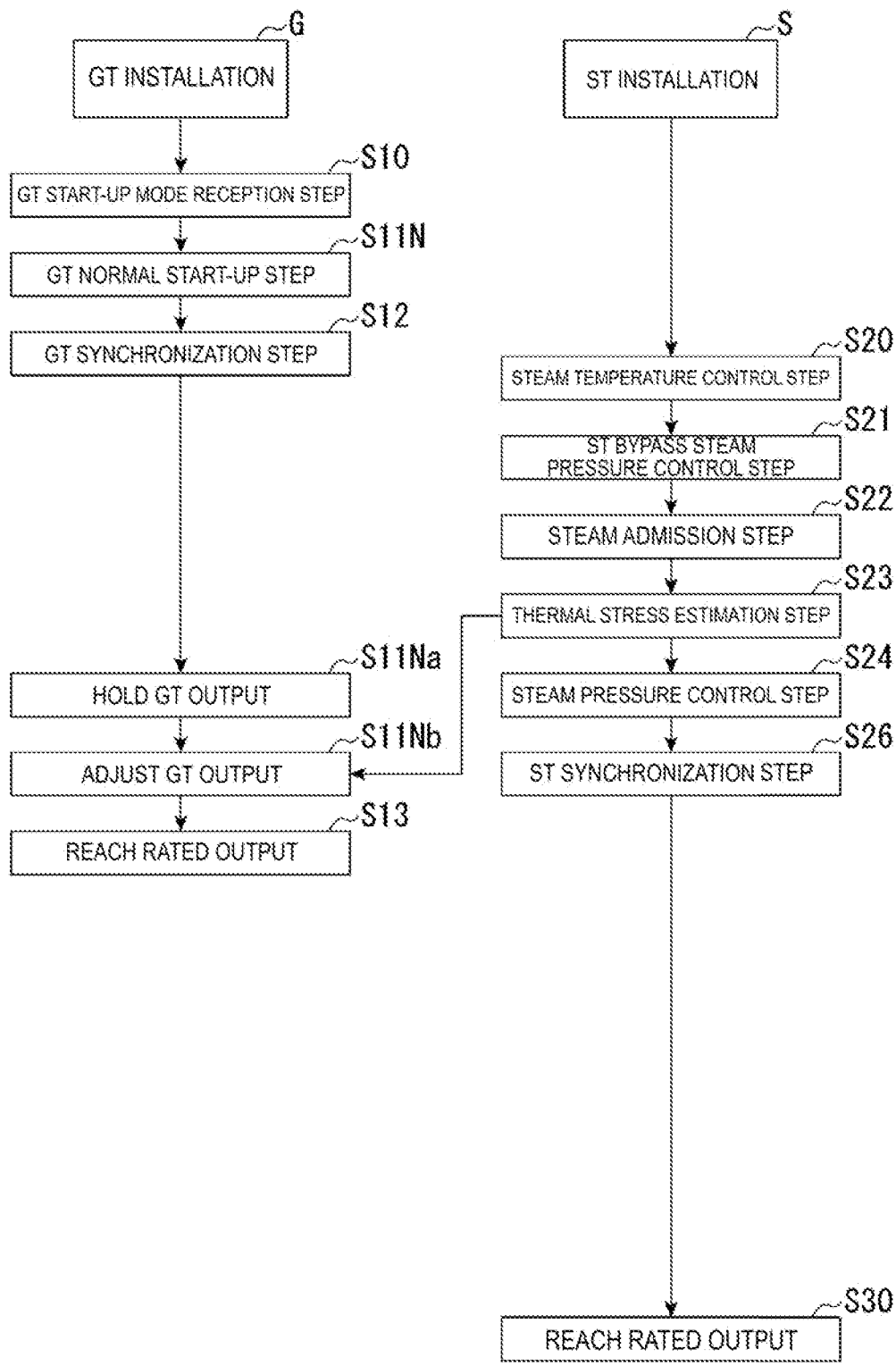
FIG. 3 is a flowchart showing operations of the control device when a GT normal start-up mode is received in the first embodiment according to the present disclosure.
Figure 4:
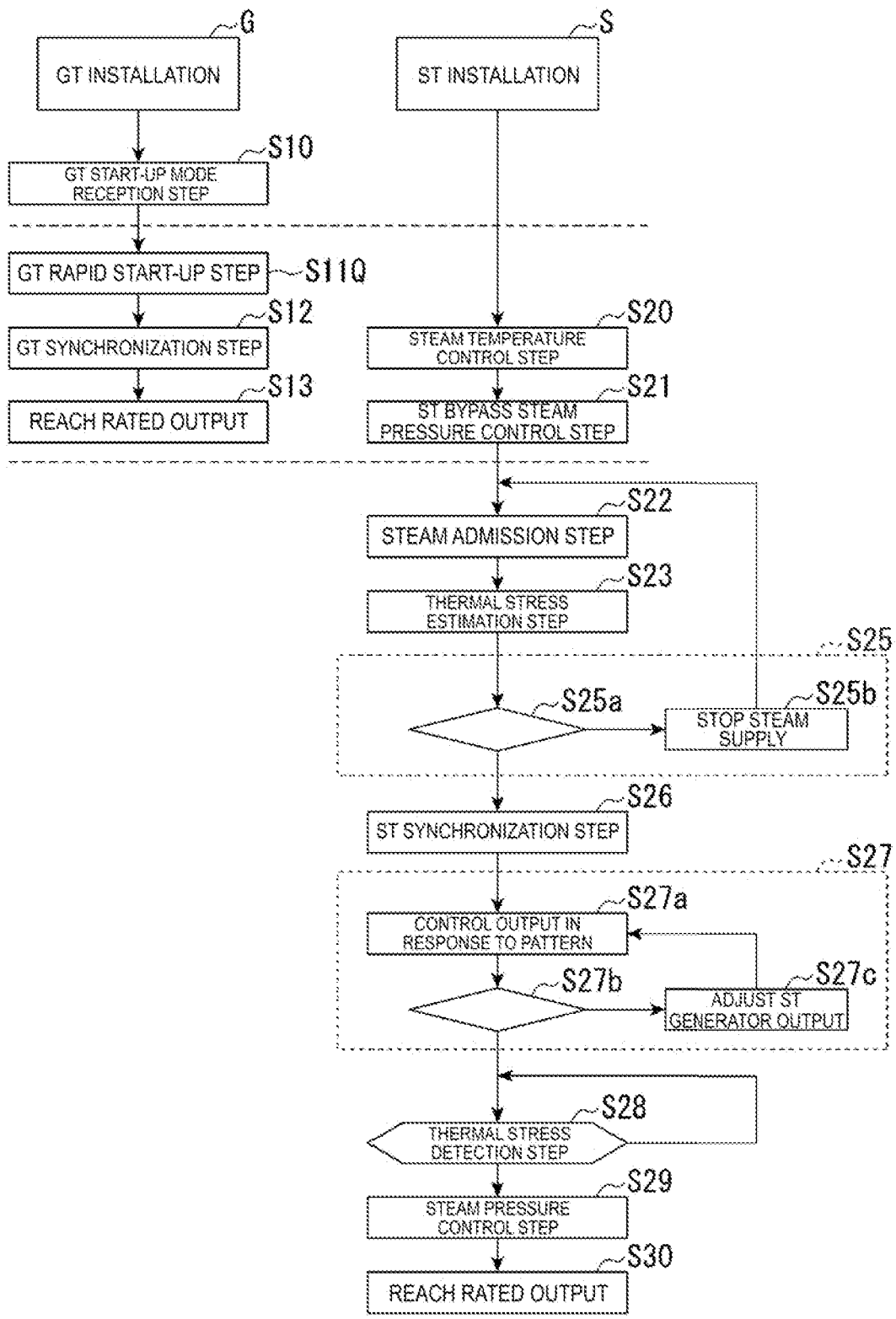
FIG. 4 is a flowchart showing operations of the control device when a GT rapid start-up mode is received in the first embodiment according to the present disclosure.

Next, the operation of the control device 50 described above will be described according to flowcharts shown in FIGS. 3 and 4.

In the present embodiment, there are two start-up modes of the gas turbine 10: a GT rapid start-up mode and a GT normal start-up mode. The GT rapid start-up mode is a mode in which the gas turbine 10 is started rapidly by increasing the output of the gas turbine 10 to the rated output regardless of the state of the steam turbine 30. The GT normal start-up mode is a mode in which the gas turbine 10 is not started rapidly. First, the operation of the control device 50 in the GT normal start-up mode will be described with reference to the flowchart shown in FIG. 3.

Figure 5:
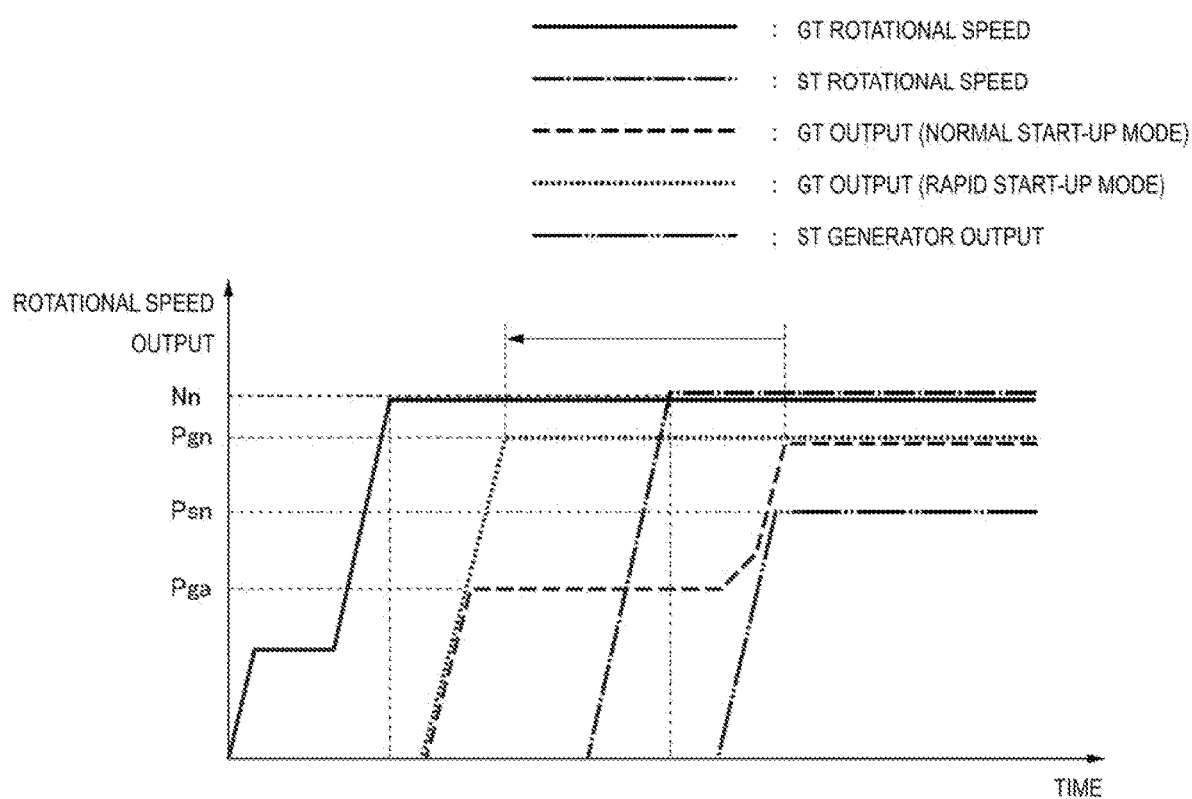
FIG. 5 is a graph showing changes over time in a gas turbine rotational speed, a gas turbine output, a steam turbine rotational speed, and a steam turbine output in the first embodiment according to the present disclosure.

First, the GT start-up mode reception unit 61 of the control device 50 receives the start-up mode of the gas turbine 10 from the outside (S10: GT start-up mode reception step). When the GT start-up mode reception unit 61 receives the GT normal start-up mode, the GT start-up fuel control unit 62 executes a GT normal start-up step (S11N). In the GT normal start-up step (S11N), until the GT generator 17 is synchronized to the power system 1, as shown in FIG. 5, the GT start-up fuel control unit 62 commands the fuel control valve 16 on a flow rate of fuel to be supplied to the gas turbine 10 so that the rotational speed of the gas turbine 10 detected by the GT rotational speed meter 42 changes according to a predetermined rotational speed change pattern (solid line in FIG. 5). As a result, in the process in which the rotational speed of the gas turbine 10 indicated by the rotational speed change pattern is increasing, the flow rate of the fuel supplied to the gas turbine 10 increases. Thus, in this process, the temperature of steam generated from the waste heat recovery boiler 20 gradually increases, and the amount of the generated steam gradually increases. In the GT normal start-up step (S11N), during a period from when the GT generator 17 is synchronized to the power system 1 to when the gas turbine output reaches a rated output Pgn, the GT start-up fuel control unit 62 commands the fuel control valve 16 on the flow rate of the fuel to be supplied to the gas turbine 10 so that the gas turbine output detected by the GT output gauge 41 (long dashed line in FIG. 5) changes according to a predetermined normal output change pattern, as shown in FIG. 5. As a result, in the process in which the gas turbine output is increasing as indicated by the normal output change pattern, the flow rate of the fuel supplied to the gas turbine 10 increases. Thus, also in this process, the temperature of the steam generated from the waste heat recovery boiler 20 gradually increases, and the amount of the generated steam gradually increases.

During execution of the GT normal start-up step (S11N), as shown in FIG. 5, when the rotational speed of the gas turbine 10 (solid line in FIG. 5) reaches a rated rotational speed Nn, the GT synchronization command unit 63 of the control device 50 commands the GT circuit breaker 18 to electrically connect the GT generator 17 to the power system 1 (S12: GT synchronization step). As a result, the GT generator 17 is synchronized to the power system 1, and the gas turbine output can be detected by the GT output gauge 41.

When the GT generator 17 is synchronized to the power system 1, as described above, as part of the GT normal start-up step (S11N), the GT start-up fuel control unit 62 commands the fuel control valve 16 on the flow rate of the fuel to be supplied to the gas turbine 10 so that the gas turbine output detected by the GT output gauge 41 changes according to the predetermined normal output change pattern. As shown in FIG. 5, the normal output change pattern is set so that when the gas turbine output reaches a low output Pga lower than the rated output Pgn, the low output Pga is maintained for a predetermined time. Thus, as part of the GT normal start-up step (S11N), when the gas turbine output (long dashed line in FIG. 5) reaches the low output Pga, the GT start-up fuel control unit 62 commands the fuel control valve 16 on the flow rate of the fuel to be supplied to the gas turbine 10 so that the low output Pga is maintained (S11Na).

As shown in FIG. 5, the normal output change pattern is set so that after the low output Pga is maintained for the predetermined time, the gas turbine output gradually increases from the low output Pga to the rated output Pgn. Thus, as part of the GT normal start-up step (S11N), after causing the fuel control valve 16 to maintain the low output Pga for the predetermined time, the GT start-up fuel control unit 62 commands the fuel control valve 16 on the flow rate of the fuel to be supplied to the gas turbine 10 so that the gas turbine output (long dashed line in FIG. 5) is gradually increased to the rated output Pgn. The operation of the GT start-up fuel control unit 62 causes the gas turbine output to reach the rated output Pgn (S13).

When the thermal stress generated in the steam turbine 30 reaches or exceeds a predetermined thermal stress while maintaining the gas turbine output at the low output Pga or while increasing the gas turbine output from the low output Pga to the rated output Pgn, the GT start-up fuel control unit 62 adjusts the gas turbine output (S11Nb), regardless of the normal output change pattern, as part of the GT normal start-up step (S11N). Specifically, when the thermal stress generated in the steam turbine 30 reaches or exceeds the predetermined thermal stress, the GT start-up fuel control unit 62 commands the fuel control valve 16 to temporarily reduce the flow rate of the fuel to be supplied to the gas turbine 10. As a result, the gas turbine output falls below the gas turbine output indicated by the normal output change pattern. Thus, any one of the temperature, the pressure, and the flow rate of the steam flowing into the steam turbine 30 becomes smaller, and the thermal stress generated in the steam turbine 30 falls below the predetermined thermal stress. When the thermal stress generated in the steam turbine 30 falls below the predetermined thermal stress, the GT start-up fuel control unit 62 again commands the fuel control valve 16 on the flow rate of the fuel to be supplied to the gas turbine 10 so that the gas turbine output changes according to the normal output change pattern.

As described above, when the fuel is supplied to the gas turbine 10, the steam is generated from the waste heat recovery boiler 20. The steam temperature control unit 75 of the control device 50 commands the desuperheater 26 so that the temperature of the steam detected by the thermometer 47 does not exceed a predetermined temperature at least until the steam turbine output reaches a rated output (S20: steam temperature control step). When the spray amount control valve 26v of the desuperheater 26 receives the command, the amount of water sprayed from the spray 26s to the main steam line 21 becomes an amount of water sprayed corresponding to the command. As a result, the temperature of the steam at a position in the main steam line 21 closer to the steam turbine 30 than a position where the desuperheater 26 is provided does not exceed the predetermined temperature.

The ST bypass steam pressure control unit 73 of the control device 50 commands the bypass valve 24 to open (S21: ST bypass steam pressure control step) when the steam pressure detected by the pressure gauge 48 reaches or exceeds a predetermined value (which may not be a fixed value) at least until the steam turbine output reaches the rated output. Thus, when the pressure of the steam detected by the pressure gauge 48 reaches or exceeds the predetermined value during a period from when the steam starts to be generated from the waste heat recovery boiler 20 until at least the steam turbine output reaches the rated output, the bypass valve 24 opens, and some of the steam from the waste heat recovery boiler 20 is sent to the condenser 34 via the bypass line 23.

When the temperature of the steam detected by the thermometer 47 reaches or exceeds the predetermined temperature, the steam admission command unit 76 of the control device 50 commands the steam control valve 22 to open so that the steam supply to the steam turbine 30 is started (S22: steam admission step). As a result, the steam generated in the waste heat recovery boiler 20 flows into the steam turbine 30 via the main steam line 21 and the steam control valve 22. The steam turbine 30 begins to be driven by the steam. The steam admission step (S22) is basically executed after the GT synchronization step (S12).

When the steam admission step (S22) is executed, the thermal stress estimating unit 78 of the control device 50 estimates the thermal stress generated in the steam turbine 30 at least until the steam turbine output reaches the rated output (S23: thermal stress estimation step). When steam starts to flow into the steam turbine 30, a high thermal stress is generated in a portion in the vicinity of an inlet in the steam turbine rotor 33 in the vicinity of the steam inlet. The thermal stress estimating unit 78 estimates the thermal stress of the portion in the vicinity of the inlet. Specifically, the thermal stress estimating unit 78 first estimates the temperature in the portion in the vicinity of the inlet at the present time from the temperature of the steam detected by the thermometer 47, and obtains the temperature differential between this temperature and the temperature in the portion of the vicinity of the inlet estimated a predetermined time ago. Then, the thermal stress estimating unit 78 obtains the thermal stress of the portion in the vicinity of the inlet based on the temperature differential, the shape of the portion in the vicinity of the inlet, the Young's modulus and the expansion coefficient of the material forming the portion in the vicinity of the inlet, and the like. The thermal stress estimated by the thermal stress estimating unit 78 is used when adjusting the gas turbine output described above (S11Nb).

When the steam admission step (S22) is executed, the steam pressure control unit 72 of the control device 50 commands the control valve 22b of the steam control valve 22 on the degree of opening so that the flow rate of steam flowing into the steam turbine 30 gradually increases, and commands the bypass valve 24 on the degree of opening so that the steam pressure detected by the pressure gauge 48 increases according to a predetermined pressure change pattern (S24: steam pressure control step).

During execution of the steam pressure control step (S24), when the rotational speed of the steam turbine 30 (alternate long and short dash line in FIG. 5) reaches a rated rotational speed Nn, the ST synchronization command unit 74 of the control device 50 commands the ST circuit breaker 38 to electrically connect the ST generator 37 to the power system 1 (S26: ST synchronization step). As a result, the ST generator 37 is synchronized to the power system 1, and the steam turbine output can be detected by the ST generator output gauge 45.

After the execution of the ST synchronization step (S26), the steam pressure control step (S24) is still executed, and as shown in FIG. 5, the steam turbine output (two-dot chain line in FIG. 5) reaches a rated output Psn.

Thus, the start-up of the gas turbine 10 and the start-up of the steam turbine 30 in the GT normal start-up mode are completed.

Next, the operation of the control device 50 in the GT rapid start-up mode will be described with reference to the flowchart shown in FIG. 4.

First, the GT start-up mode reception unit 61 of the control device 50 receives the start-up mode of the gas turbine 10 from the outside (S10: GT start-up mode reception step). When the GT start-up mode reception unit 61 receives the GT rapid start-up mode, the GT start-up fuel control unit 62 executes a GT rapid start-up step (S11Q). Also in the GT rapid start-up step (S11Q), as in the GT normal start-up step (S11N), until the GT generator 17 is synchronized to the power system 1, as shown in FIG. 5, the GT start-up fuel control unit 62 commands the fuel control valve 16 on the flow rate of the fuel to be supplied to the gas turbine 10 so that the rotational speed of the gas turbine 10 detected by the GT rotational speed meter 42 (solid line in FIG. 5) changes according to the predetermined rotational speed change pattern. As a result, in the process in which the rotational speed of the gas turbine 10 indicated by the rotational speed change pattern is increasing, the flow rate of the fuel supplied to the gas turbine 10 increases. Thus, in this process, the temperature of the steam generated from the waste heat recovery boiler 20 gradually increases, and the amount of the generated steam gradually increases. In the GT rapid start-up step (S11Q), during the period from when the GT generator 17 is synchronized to the power system 1 to when the gas turbine output reaches the rated output, the GT start-up fuel control unit 62 commands the fuel control valve 16 on the flow rate of the fuel to be supplied to the gas turbine 10 so that the gas turbine output detected by the GT output gauge 41 (short dashed line in FIG. 5) changes according to a predetermined rapid output change pattern, as shown in FIG. 5. In the present embodiment, the rapid output change pattern is set so that the gas turbine output changes linearly over time. As a result, the flow rate of the fuel supplied to the gas turbine 10 gradually increases over time. Thus, also in this process, the temperature of the steam generated from the waste heat recovery boiler 20 gradually increases, and the amount of the generated steam gradually increases.

During execution of the GT rapid start-up step (S11Q), as shown in FIG. 5, when the rotational speed of the gas turbine 10 reaches the rated rotational speed Nn, the GT synchronization command unit 63 of the control device 50 commands the GT circuit breaker 18 to electrically connect the GT generator 17 to the power system 1 (S12: GT synchronization step). As a result, the GT generator 17 is synchronized to the power system 1, and the gas turbine output can be detected by the GT output gauge 41.

After the execution of the GT synchronization step (S12), the GT rapid start-up step (S11Q) is still executed, and as shown in FIG. 5, the gas turbine output (short dashed line in FIG. 5) reaches the rated output Pgn.

As described above, when the fuel is supplied to the gas turbine 10, the steam is generated from the waste heat recovery boiler 20. When the GT start-up mode reception unit 61 receives the GT rapid start-up mode, as when the GT start-up mode reception unit 61 receives the GT normal start-up mode, the steam temperature control unit 75 of the control device 50 commands the desuperheater 26 so that the temperature of the steam detected by the thermometer 47 does not exceed the predetermined temperature at least until the steam turbine output reaches the rated output (S20: steam temperature control step). When the spray amount control valve 26v of the desuperheater 26 receives the command, the spray 26s sprays the amount of water corresponding to the command to the main steam line 21. As a result, the temperature of the steam at the position in the main steam line 21 closer to the steam turbine 30 than the position where the desuperheater 26 is provided does not exceed the predetermined temperature.

The ST bypass steam pressure control unit 73 of the control device 50 commands the bypass valve 24 to open (S21: ST bypass steam pressure control step) when the steam pressure detected by the pressure gauge 48 reaches or exceeds the predetermined value (which may not be a fixed value), at least until the steam turbine output reaches the rated output. Thus, when the pressure of the steam detected by the pressure gauge 48 reaches or exceeds the predetermined value during the period from when the steam starts to be generated from the waste heat recovery boiler 20 until at least the steam turbine output reaches the rated output, the bypass valve 24 opens, and some of the steam from the waste heat recovery boiler 20 is sent to the condenser 34 via the bypass line 23.

When the temperature of the steam detected by the thermometer 47 reaches or exceeds the predetermined temperature, the steam admission command unit 76 of the control device 50 commands the steam control valve 22 to open so that the steam supply to the steam turbine 30 is started (S22: steam admission step). As a result, the steam generated in the waste heat recovery boiler 20 flows into the steam turbine 30 via the main steam line 21 and the steam control valve 22. The steam turbine 30 begins to be driven by the steam. The steam admission step (S22) is executed after the GT synchronization step (S12) described above is executed and the gas turbine output reaches the rated output Pgn (S13), that is, after the GT rapid start-up step (S11Q) is completed.

When the steam admission step (S22) is executed, as when the GT start-up mode reception unit 61 receives the GT normal start-up mode, the thermal stress estimating unit 78 of the control device 50 estimates the thermal stress generated in the steam turbine 30 at least until the steam turbine output reaches the rated output (S23: thermal stress estimation step).

The steam supply stop command unit 77 of the control device 50 executes a steam supply stop step (S25) during a period from the start of steam supply to the steam turbine 30 to the execution of the ST synchronization step (S26) described later. In the steam supply stop step (S25), the steam supply stop command unit 77 first detects whether the thermal stress estimated in the thermal stress estimation step (S23) has reached or exceeded a predetermined second thermal stress (S25a). Then, when the steam supply stop command unit 77 detects that the thermal stress estimated in the thermal stress estimation step (S23) has reached or exceeded the predetermined second thermal stress, the steam supply stop command unit 77 commands the steam control valve 22 to close the valve (S25b) so that the steam supply to the steam turbine 30 is stopped.

Thus, in the present embodiment, even when a thermal stress that reaches or exceeds the second thermal stress occurs in the steam turbine 30 during the period from the start of the steam supply to the steam turbine 30 to the execution of the synchronization step, the time during which the thermal stress occurs can be minimized, thereby minimizing deterioration of the steam turbine 30 due to the thermal stress.

After the steam supply stop step (S25) is executed, the steam admission step (S22) described above is executed again.

After the steam admission step (S22) is executed, when the thermal stress estimated in the thermal stress estimation step (S23) falls below the predetermined second thermal stress and the rotational speed of the steam turbine 30 (alternate long and short dash line in FIG. 5) reaches the rated rotational speed Nn, the ST synchronization command unit 74 of the control device 50 commands the ST circuit breaker 38 to electrically connect the ST generator 37 to the power system 1 (S26: ST synchronization step). As a result, the ST generator 37 is synchronized to the power system 1, and the steam turbine output can be detected by the ST generator output gauge 45.

After the ST synchronization step (S26) is executed, the ST generator output control unit 71 of the control device 50 executes an ST generator output control step (S27). As part of the ST generator output control step (S27), the ST generator output control unit 71 commands the control valve 22b on the degree of opening to control the flow rate of the steam flowing into the steam turbine 30 so that the output of the ST generator 37, that is, the steam turbine output, increases according to the target output change pattern (S27a). The target output change pattern is set so that the thermal stress generated in the steam turbine 30 does not reach the predetermined first thermal stress. The first thermal stress may have the same value as the second thermal stress described above, or may have a different value from the second thermal stress described above. Even when the steam turbine output is controlled to increase according to the target output change pattern as described above, the thermal stress generated in the steam turbine 30 may reach or exceed the first thermal stress. Thus, as part of the ST generator output control step (S27), the ST generator output control unit 71 detects whether the thermal stress estimated in the thermal stress estimation step (S23) has reached or exceeded the predetermined first thermal stress (S27b). Then, when the ST generator output control unit 71 detects that the thermal stress estimated in the thermal stress estimation step (S23) has reached or exceeded the predetermined first thermal stress, as part of the ST generator output control step (S27), the ST generator output control unit 71 commands the control valve 22b on the degree of opening to adjust the flow rate of the steam flowing into the steam turbine 30 so that the change in the steam turbine output is smaller than the change indicated by the target output change pattern (S27c). At this time, the ST generator output control unit 71 controls the flow rate of the steam flowing into the steam turbine 30 so that the steam turbine output is temporarily maintained.

During the execution of the ST generator output control step (S27), the thermal stress detection unit 79 of the control device 50 executes a thermal stress detection step (S28). In the thermal stress detection step (S28), the thermal stress detection unit 79 detects whether the thermal stress has reached a stable thermal stress state in which an amount of change per unit time of the thermal stress estimated in the thermal stress estimation step (S23) is smaller than a predetermined amount of change and the thermal stress at the present time is smaller than the first thermal stress.

If the thermal stress is detected to be not stable in the thermal stress detection step (S28), the ST generator output control step (S27) is continued. On the other hand, if the thermal stress is detected to be stable in the thermal stress detection step (S28), the ST generator output control step (S27) is completed, and the steam pressure control unit 72 of the control device 50 executes a steam pressure control step (S29). In the steam pressure control step (S29), as in the steam pressure control step (S24) described with reference to FIG. 3, the steam pressure control unit 72 commands the control valve 22b of the steam control valve 22 on the degree of opening so that the flow rate of the steam flowing into the steam turbine 30 gradually increases, and commands the bypass valve 24 on the degree of opening so that the steam pressure detected by the pressure gauge 48 increases according to the predetermined pressure change pattern.

By executing the steam pressure control step (S29), as shown in FIG. 5, the steam turbine output (two-dot chain line in FIG. 5) reaches the rated output Psn.

Thus, the start-up of the gas turbine 10 and the start-up of the steam turbine 30 in the GT rapid start-up mode are completed.

In the present embodiment, when the GT start-up mode reception unit 61 receives the GT normal start-up mode, as described with reference to FIG. 5, the gas turbine output (long dashed line in FIG. 5) is maintained at the low output Pga lower than the rated output Pgn for the predetermined time so that the thermal stress generated in the steam turbine 30 is not high.

The amount of steam supplied to the steam turbine 30 per unit time has a positive correlation with the steam turbine output. In addition, in the initial stage of the start-up process of the steam turbine 30 (for a predetermined time after ST synchronization), the thermal stress in the steam turbine 30 has a positive correlation with the steam turbine output. Thus, in the present embodiment, when the GT start-up mode reception unit 61 receives the GT rapid start-up mode, the flow rate of the steam flowing into the steam turbine 30 is controlled based on the steam turbine output detected by the ST generator output gauge 45, so that the thermal stress generated in the steam turbine 30 does not reach or exceed the predetermined thermal stress. Therefore, in the present embodiment, when the GT start-up mode reception unit 61 receives the GT rapid start-up mode, unlike when the GT start-up mode reception unit 61 receives the GT normal start-up mode, there is no need to maintain the gas turbine output at the low output Pga for the predetermined time.

Thus, in the present embodiment, as shown in FIG. 5, when the GT start-up mode reception unit 61 receives the GT rapid start-up mode, the time required for the gas turbine output to reach the rated output Pgn (short dashed line in FIG. 5) can be shorter than when the GT start-up mode reception unit 61 receives the GT normal start-up mode, while suppressing the thermal stress generated in the steam turbine 30. In other words, in the present embodiment, when the GT start-up mode reception unit 61 receives the GT rapid start-up mode, the time required for the gas turbine output to reach the rated output Pgn can be shorter than when the gas turbine output is maintained at the low output for the predetermined time, while suppressing the thermal stress generated in the steam turbine 30.

Second Embodiment

The present embodiment will be described with reference to FIG. 6.

Figure 6:
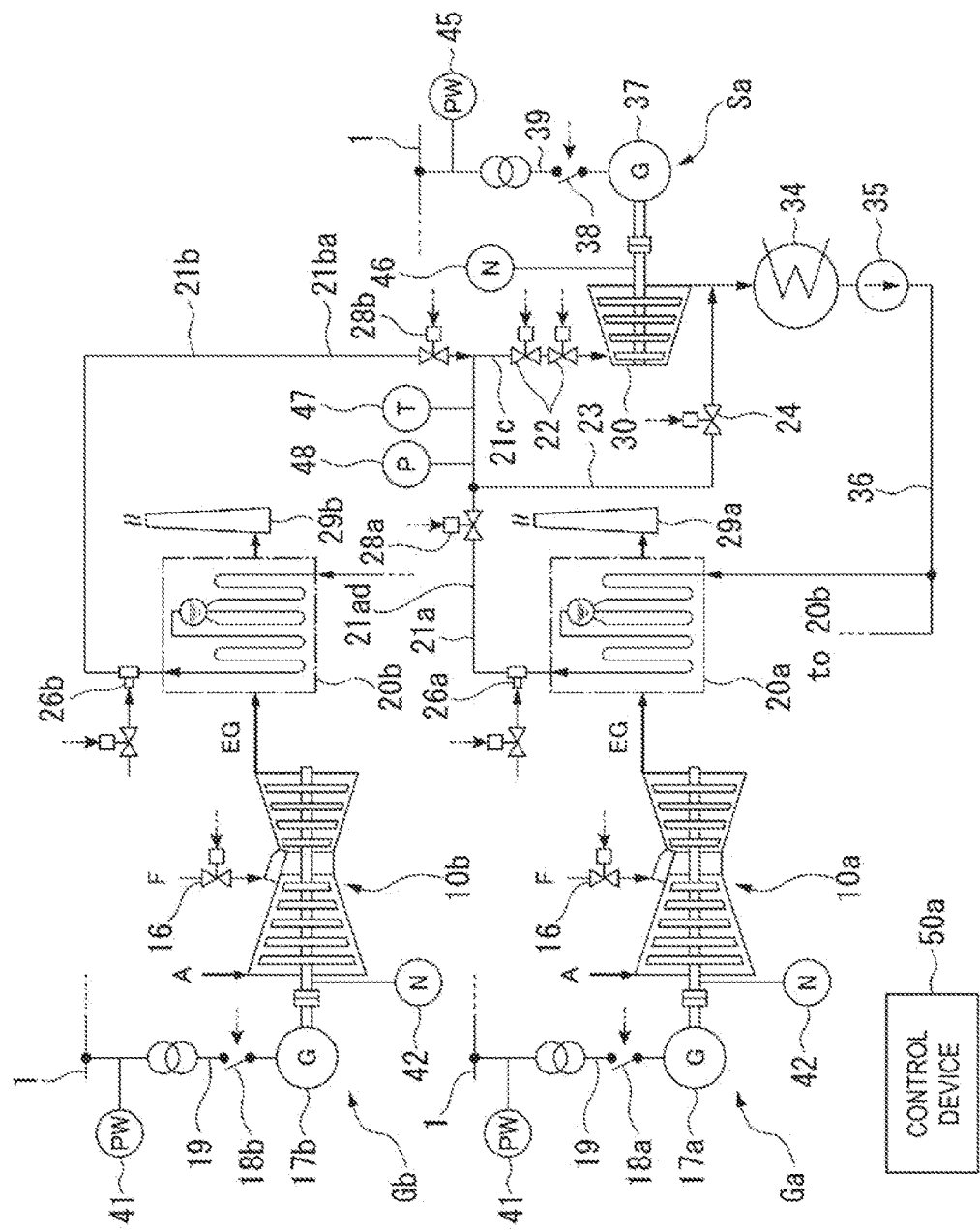
FIG. 6 is a system diagram illustrating a combined cycle plant in a second embodiment according to the present disclosure.

As illustrated in FIG. 6, a combined cycle plant of the present embodiment includes a first gas turbine installation Ga, a second gas turbine installation Gb, a steam turbine installation Sa, and a control device 50a.

Both the first gas turbine installation Ga and the second gas turbine installation Gb are the same as the gas turbine installation G in the first embodiment. Accordingly, the first gas turbine installation Ga includes a first gas turbine 10a, a first GT generator 17a, a first GT circuit breaker 18a, a first waste heat recovery boiler 20a, and a first stack 29a. The second gas turbine installation Gb includes a second gas turbine 10b, a second GT generator 17b, a second GT circuit breaker 18b, a second waste heat recovery boiler 20b, and a second stack 29b.

The steam turbine installation Sa in the present embodiment, similarly to the steam turbine installation S in the first embodiment, for the first gas turbine installation Ga, includes the first waste heat recovery boiler 20a, which is a common device with the first gas turbine installation Ga, a steam turbine 30, an ST generator 37, an ST circuit breaker 38, a condenser 34, a feedwater pump 35, a first main steam line 21a, a steam control valve 22, a bypass line 23, a bypass valve 24, a feedwater line 36, a first desuperheater 26a, an ST generator output gauge 45, an ST rotational speed meter 46, a thermometer 47, and a pressure gauge 48. The first main steam line 21a connects a steam outlet of the first waste heat recovery boiler 20a and a steam inlet of the steam turbine 30.

The steam turbine installation Sa of the present embodiment further includes the second waste heat recovery boiler 20b, which is a common device with the second gas turbine installation Gb, a second main steam line 21b, a second desuperheater 26b, a first switching valve 28a, and a second switching valve 28b. The second main steam line 21b connects a steam outlet of the second waste heat recovery boiler 20b and the steam inlet of the steam turbine 30. Accordingly, the second main steam line 21b and the first main steam line 21a share a portion on the steam turbine 30 side. Here, the portion shared by the second main steam line 21b and the first main steam line 21a is referred to as a shared main steam line 21c. A portion of the second main steam line 21b excluding the shared main steam line 21c is referred to as a second main steam dedicated line 21bd, and a portion of the first main steam line 21a excluding the shared main steam line 21c is referred to as a first main steam dedicated line 21ad.

The steam control valve 22 is provided in the shared main steam line 21c. A second switching valve 28b is provided in the second main steam dedicated line 21bd. A first switching valve 28a is provided at a position in the first main steam dedicated line 21ad closer to the first waste heat recovery boiler 20a than a branch position of the bypass line 23.

When the first gas turbine 10a is started and the second gas turbine 10b is not started, the first switching valve 28a is open and the second switching valve 28b is closed. Thus, the steam generated in the first waste heat recovery boiler 20a by starting up the first gas turbine 10a flows into the steam turbine 30 via the first main steam line 21a. When the steam pressure detected by the pressure gauge 48 increases, the bypass valve 24 opens, and some of the steam generated in the first waste heat recovery boiler 20a is sent to the condenser 34 via the bypass line 23.

When the first gas turbine 10a is not started and the second gas turbine 10b is started, the first switching valve 28a is closed and the second switching valve 28b is open. Thus, the steam generated in the second waste heat recovery boiler 20b by starting up the second gas turbine 10b flows into the steam turbine 30 via the second main steam line 21b. When the steam pressure detected by the pressure gauge 48 increases, the bypass valve 24 opens, and some of the steam generated in the second waste heat recovery boiler 20b is sent to the condenser 34 via the bypass line 23.

When the first gas turbine 10a and the second gas turbine 10b are started, the first switching valve 28a and the second switching valve 28b are both open. Thus, the steam generated in the first waste heat recovery boiler 20a by starting up the first gas turbine 10a flows into the steam turbine 30 via the first main steam line 21a, and the steam generated in the second waste heat recovery boiler 20b flows into the steam turbine 30 via the second main steam line 21b. When the steam pressure detected by the pressure gauge 48 increases, the bypass valve 24 opens, and some of the steam generated in the first waste heat recovery boiler 20a or some of the steam generated in the second waste heat recovery boiler 20b is sent to the condenser 34 via the bypass line 23.

The control device 50a is a computer like the control device 50 of the first embodiment. The control device 50a functionally includes a start-up control unit for the first gas turbine installation Ga, a start-up control unit for the second gas turbine installation Gb, and a start-up control unit for the steam turbine installation S. Both the start-up control unit for the first gas turbine installation Ga and the start-up control unit for the second gas turbine installation Gb have the same configuration as the start-up control unit 60g in the control device 50 of the first embodiment. The start-up control unit for the steam turbine installation S has basically the same configuration as the start-up control unit 60s in the control device 50 of the first embodiment. However, the start-up control unit for the steam turbine installation S in the present embodiment further includes a switching control unit that controls opening and closing of the first switching valve 28a and the second switching valve 28b.

Also in the present embodiment, as in the first embodiment, when the GT start-up mode reception unit 61 receives the GT rapid start-up mode, the time required for the gas turbine output to reach the rated output Pgn can be shorter than when the GT start-up mode reception unit 61 receives the GT normal start-up mode, while suppressing the thermal stress generated in the steam turbine 30.

The combined cycle plant of the present embodiment is a plant including two gas turbine installations Ga and Gb for one steam turbine installation S. However, the combined cycle plant may be a plant including three or more gas turbine installations G for one steam turbine installation S.

Modification Example

Each of the control devices 50 and 50a in the above embodiments includes the GT start-up mode reception unit 61. When the GT start-up mode reception unit 61 receives the GT rapid start-up mode, the GT rapid start-up step (S11Q) is executed, and when the GT start-up mode reception unit 61 receives the GT normal start-up mode, the GT normal start-up step (S11N) is executed. However, the control device that does not include the GT start-up mode reception unit 61 may be used. In this case, the control device executes a GT start-up step similar to the GT rapid start-up step (S11Q) in each of the embodiments.

Each of the control devices 50 and 50a in the embodiments is configured by one computer. However, the control device may be configured by a computer for the gas turbine installation and a computer for the steam turbine installation. In this case, the two computers need to be able to communicate with each other via a local network or the like. Alternatively, the control device may be functionally configured by a controller having only the function of the ST bypass steam pressure control unit 73 and a controller having only the function of the steam temperature control unit 75 in addition to the computer including the GT start-up fuel control unit 62, the ST generator output control unit 71, the steam pressure control unit 72, and the like.

While the preferred embodiments of the present invention and the modification examples thereof have been described above, the present invention is not limited to the embodiments and the modification examples thereof. additions, omissions, substitutions, and other changes in configuration are possible without departing from the scope of the present invention. The present invention is not to limited by the foregoing description, but only by the scope of the appended claims.

Supplementary Notes

The method for starting up the combined cycle plant according to the embodiments described above can be understood, for example, as follows.

(1) A method for starting up a combined cycle plant according to a first aspect is applied to the following combined cycle plant.

The combined cycle plant includes a gas turbine 10 configured to be driven by fuel supply, a waste heat recovery boiler 20 configured to generate steam by using heat from exhaust gas exhausted from the gas turbine 10, a steam turbine 30 configured to be driven by the steam from the waste heat recovery boiler 20, a condenser 34 configured to return the steam exhausted from the steam turbine 30 to water, and a generator configured to generate electricity by the steam turbine 30 drive.

The method for starting up a combined cycle plant includes a gas turbine start-up step of increasing an output of the gas turbine 10 to a rated output by supplying fuel to the gas turbine 10, a steam admission step (S22) of, when a temperature of the steam from the waste heat recovery boiler 20 reaches or exceeds a predetermined temperature, starting steam supply to the steam turbine 30, a synchronization step (S26) of, after the steam admission step (S22), when a rotational speed of the steam turbine 30 reaches a rated rotational speed, synchronizing the generator to a power system 1, an ST generator output control step (S27) of, after the generator is synchronized, controlling a flow rate of the steam flowing into the steam turbine 30 so that an output of the generator increases according to a target output change pattern, and a thermal stress estimation step (S23) of estimating a thermal stress generated in the steam turbine 30 based on a temperature of the steam flowing into the steam turbine 30. In the ST generator output control step (S27), when the thermal stress estimated in the thermal stress estimation step (S23) reaches or exceeds a predetermined first thermal stress, the flow rate of the steam flowing into the steam turbine 30 is controlled so that a change in the output of the generator is smaller than a change indicated by the target output change pattern.

An amount of steam supplied to the steam turbine 30 per unit time has a positive correlation with a steam turbine output that is the output of the generator. In addition, the thermal stress in the steam turbine 30 has a positive correlation with the steam turbine output for a predetermined time after the generator connected to the steam turbine 30 is synchronized to the power system 1. Thus, in this aspect, the flow rate of the steam flowing into the steam turbine 30 is controlled based on the steam turbine output so that the thermal stress generated in the steam turbine 30 does not reach or exceed the predetermined thermal stress. Therefore, in this aspect, there is no need to maintain the gas turbine output at a low output lower than the rated output for a predetermined time to prevent the thermal stress generated in the steam turbine 30 from becoming too high.

Thus, in this aspect, the time required for the gas turbine output to reach the rated output can be shorter than when the gas turbine output is maintained at the low output for the predetermined time, while suppressing the thermal stress generated in the steam turbine 30.

(2) In a method for starting up a combined cycle plant according to a second aspect, in the method for starting up a combined cycle plant according to the first aspect, in the ST generator output control step (S27), when the thermal stress estimated in the thermal stress estimation step (S23) reaches or exceeds the predetermined first thermal stress, the flow rate of the steam flowing into the steam turbine 30 is controlled so that the output of the generator is temporarily maintained.

(3) In the method for starting up a combined cycle plant according to the first aspect or the second aspect, a method for starting up a combined cycle plant according to a third aspect further includes an ST bypass steam pressure control step (S21) of, when a pressure of the steam flowing into the steam turbine 30 reaches or exceeds a predetermined value, sending some of the steam from the waste heat recovery boiler 20 to the condenser 34 without supplying the some of the steam to the steam turbine 30.

In this aspect, the pressure of the steam flowing into the steam turbine 30 can be avoided from exceeding the predetermined pressure.

(4) In the method for starting up a combined cycle plant according to any one of the first aspect to the third aspect, a method for starting up a combined cycle plant according to a fourth aspect further includes a steam temperature control step (S20) of controlling the temperature of the steam from the waste heat recovery boiler 20 so that the temperature of the steam flowing into the steam turbine 30 does not exceed a predetermined temperature.

In this aspect, the temperature of the steam flowing into the steam turbine 30 can be avoided from exceeding the predetermined temperature.

(5) In the method for starting up a combined cycle plant according to any one of the first aspect to the fourth aspect, a method for starting up a combined cycle plant according to a fifth aspect further includes, when the thermal stress estimated in the thermal stress estimation step (S23) reaches or exceeds a predetermined second thermal stress during a period from start of the steam supply to the steam turbine 30 to execution of the synchronization step (S26), a steam supply stop step (S25) of stopping the steam supply to the steam turbine 30.

In this aspect, even when a thermal stress that reaches or exceeds the second thermal stress occurs in the steam turbine 30 during the period from the start of steam supply to the steam turbine 30 to the execution of the synchronization step (S26), the time during which the thermal stress occurs generated can be minimized, thereby minimizing deterioration of the steam turbine 30 due to the thermal stress.

(6) In a method for starting up a combined cycle plant according to a sixth aspect, in the method for starting up a combined cycle plant according to any one of the first aspect to the fifth aspect, the target output change pattern used in the ST generator output control step (S27) is set so that the thermal stress generated in the steam turbine 30 does not reach the predetermined first thermal stress.

(7) In the method for starting up a combined cycle plant according to any one of the first aspect to the sixth aspect, a method for starting up a combined cycle plant according to a seventh aspect further includes a thermal stress detection step (S28) of detecting whether the thermal stress has reached a stable state in which an amount of change per unit time of the thermal stress estimated in the thermal stress estimation step (S23) is smaller than a predetermined amount of change and the thermal stress is smaller than the predetermined first thermal stress, and a steam pressure control step (S24) of, after the ST generator output control step (S27) is completed by detecting that the thermal stress has reached the stable state in the thermal stress detection step (S28), controlling the pressure of the steam flowing into the steam turbine 30 so that the pressure of the steam flowing into the steam turbine 30 is maintained within a predetermined range.

(8) In a method for starting up a combined cycle plant according to an eighth aspect, in the method for starting up a combined cycle plant according to any one aspect of the first aspect to the seventh aspect, the gas turbine start-up step is a GT rapid start-up step (S11Q) of increasing an output of the gas turbine 10 to a rated output regardless of a state of the steam turbine 30.

(9) In a method for starting up a combined cycle plant according to a ninth aspect, in the method for starting up a combined cycle plant according to the eighth aspect, the GT rapid start-up step (S11Q) ends before the steam admission step (S22).

(10) In the method for starting up a combined cycle plant according to the eighth aspect or the ninth aspect, a method for starting up a combined cycle plant according to a tenth aspect further includes a GT start-up mode reception step (S10) of receiving a mode indicating whether to rapidly start up the gas turbine 10. When a GT rapid start-up mode for rapidly starting up the gas turbine 10 is received in the GT start-up mode reception step (S10), the GT rapid start-up step (S11Q), the steam admission step (S22), the synchronization step (S26), the ST generator output control step (S27), and the thermal stress estimation step (S23) are performed.

(11) In the method for starting up a combined cycle plant according to the 10th aspect, a method for starting up a combined cycle plant according to an 11th aspect further includes a GT normal start-up step (S11N) of, when a GT normal start-up mode in which the gas turbine 10 is not started rapidly is received in the GT start-up mode reception step (S10), increasing the output of the gas turbine 10 to a rated output by supplying fuel to the gas turbine 10, a steam admission step (S22) of, when a temperature of the steam from the waste heat recovery boiler 20 reaches or exceeds a predetermined temperature, starting steam supply to the steam turbine 30, a synchronization step (S26) of, after the steam admission step (S22), when a rotational speed of the steam turbine 30 reaches a rated rotational speed, synchronizing the generator to a power system 1, and a steam pressure control step (S24) of, after the generator is synchronized, controlling a pressure of the steam flowing into the steam turbine 30 so that the pressure of the steam flowing into the steam turbine 30 increases according to a target pressure change pattern. In the GT normal start-up step (S11N), a flow rate of the fuel to be supplied to the gas turbine 10 is adjusted before the output of the gas turbine 10 reaches the rated output, so as to temporarily maintain the output of the gas turbine 10 at a predetermined low output lower than the rated output.

In this aspect, in addition to the GT rapid start-up step (S11Q), the GT normal start-up step (S11N) can be included.

(12) In the method for starting up a combined cycle plant according to the 11th aspect, in a method for starting up a combined cycle plant according to a 12th aspect, when the GT normal start-up mode in which the gas turbine 10 is not started rapidly is received in the GT start-up mode reception step (S10), the thermal stress estimation step (S23) is performed. In the GT normal start-up step (S11N), when the thermal stress estimated in the thermal stress estimation step (S23) reaches or exceeds a predetermined thermal stress, the flow rate of the fuel to be supplied to the gas turbine 10 is temporarily reduced so that the output of the gas turbine 10 is temporarily reduced.

In this aspect, the high thermal stress generated in the steam turbine 30 can be avoided during the GT normal start-up step (S11N).

The combined cycle plant according to the embodiments described above can be understood, for example, as follows.

(13) A combined cycle plant according to a 13th aspect includes a gas turbine 10 configured to be driven by fuel supply, a waste heat recovery boiler 20 configured to generate steam by using heat from exhaust gas exhausted from the gas turbine 10, a steam turbine 30 configured to be driven by the steam from the waste heat recovery boiler 20, a condenser 34 configured to return the steam exhausted from the steam turbine 30 to water, a generator 37 configured to generate electricity by the steam turbine 30 drive, a circuit breaker 38 configured to electrically connect the generator 37 to a power system 1 in response to an external command and to electrically disconnect the generator 37 from the power system 1 in response to an external command, a fuel control valve 16 configured to adjust a flow rate of fuel to be supplied to the gas turbine 10, a main steam line 21 configured to guide the steam from the waste heat recovery boiler 20 to the steam turbine 30, a steam control valve 22 provided in the main steam line 21 and configured to adjust a flow rate of the steam flowing into the steam turbine 30, a thermometer 47 provided in the main steam line 21 closer to the waste heat recovery boiler 20 than the steam control valve 22 and configured to detect a temperature of the steam flowing through the main steam line 21, a rotational speed meter 46 configured to detect a rotational speed of the steam turbine 30, an output gauge 45 configured to detect an output that is an amount of power generated by the generator 37, and a control device 50. The control device 50 includes start-up fuel control unit 62 configured to command the fuel control valve 16 to start fuel supply to the gas turbine 10 and command the fuel control valve 16 on a flow rate of fuel to be supplied to the gas turbine 10 so that the output of the gas turbine 10 increases to a rated output, a steam admission command unit 76 configured to command the steam control valve 22 to open so as to start steam supply to the steam turbine 30 when the temperature of the steam detected by the thermometer 47 reaches or exceeds a predetermined temperature, a synchronization command unit 74 configured to command the circuit breaker 38 to electrically connect the generator 37 to the power system 1 when the rotational speed detected by the rotational speed meter reaches a rated rotational speed of the steam turbine 30, an ST generator output control unit 71 configured to command the steam control valve 22 on a flow rate of the steam to flow into the steam turbine 30 after the generator 37 is electrically connected to the power system 1 so that the output detected by the output gauge 45 increases according to a target output change pattern, and a thermal stress estimating unit 78 configured to estimate thermal stress generated in the steam turbine 30 based on the temperature of the steam detected by the thermometer 47. When the thermal stress estimated by the thermal stress estimating unit 78 reaches or exceeds a predetermined value, the ST generator output control unit 71 commands the steam control valve 22 on the flow rate of the steam to flow into the steam turbine 30 so that the change in the output detected by the output gauge 45 is smaller than a change indicated by the target output change pattern.

In this aspect, as in the method for starting up a combined cycle plant in the first aspect, the time required for the gas turbine output to reach the rated output can be shorter than when the gas turbine output is maintained at the low output for the predetermined time, while suppressing the thermal stress generated in the steam turbine 30.

(14) In the combined cycle plant according to the 13th aspect, a combined cycle plant according to a 14th aspect further includes a pressure gauge 48 provided in the main steam line 21 closer to the waste heat recovery boiler 20 than the steam control valve 22 and configured to detect a pressure of the steam flowing through the main steam line 21, a bypass line 23 extending from a position in the main steam line 21 closer to the waste heat recovery boiler 20 than a position where the steam control valve 22 is provided and configured to guide the steam from the waste heat recovery boiler 20 to the condenser 34, and a bypass valve 24 provided in the bypass line 23 and configured to adjust a flow rate of the steam flowing through the bypass line 23. The control device 50 includes an ST bypass steam pressure control unit 73 configured to command the bypass valve 24 to open when the pressure of the steam detected by the pressure gauge 48 reaches or exceeds a predetermined value.

In this aspect, as in the method for starting up a combined cycle plant in the third aspect, the pressure of the steam flowing into the steam turbine 30 can be avoided from exceeding the predetermined pressure.

(15) In the combined cycle plant according to the 13th aspect or the 14th aspect, a combined cycle plant according to a 15th aspect further includes a desuperheater 26 configured to adjust the temperature of the steam flowing into the steam turbine 30 at a position in the main steam line 21 closer to the waste heat recovery boiler 20 than a position where the steam control valve 22 is provided. The control device 50 includes a steam temperature control unit 75 configured to command the desuperheater 26 so that the temperature of the steam detected by the thermometer 47 does not exceed a predetermined temperature.

In this aspect, as in the method for starting up a combined cycle plant in the fourth aspect, the temperature of the steam flowing into the steam turbine 30 can be avoided from exceeding the predetermined temperature.

The start-up control program for a combined cycle plant according to the embodiments described above can be understood, for example, as follows.

(16) A non-transitory computer-readable storage medium storing a start-up control program for a combined cycle plant according to a sixteenth aspect is applied to the following combined cycle plant.

The combined cycle plant includes a gas turbine 10 configured to be driven by fuel supply, a waste heat recovery boiler 20 configured to generate steam by using heat from exhaust gas exhausted from the gas turbine 10, a steam turbine 30 configured to be driven by the steam from the waste heat recovery boiler 20, a condenser 34 configured to return the steam exhausted from the steam turbine 30 to water, a generator 37 configured to generate electricity by the steam turbine 30 drive, a circuit breaker 38 configured to electrically connect the generator 37 to a power system 1 in response to an external command and to electrically disconnect the generator 37 from the power system 1 in response to an external command, a fuel control valve 16 configured to adjust a flow rate of fuel to be supplied to the gas turbine 10, a main steam line 21 configured to guide the steam from the waste heat recovery boiler 20 to the steam turbine 30, a steam control valve 22 provided in the main steam line 21 and configured to adjust a flow rate of the steam flowing into the steam turbine 30, a thermometer 47 provided in the main steam line 21 closer to the waste heat recovery boiler 20 than the steam control valve 22 and configured to detect a temperature of the steam flowing through the main steam line 21, a rotational speed meter 46 configured to detect a rotational speed of the steam turbine 30, an output gauge 45 configured to detect an output that is an amount of power generated by the generator 37.

The start-up control program for the combined cycle plant causes a computer to execute a gas turbine start-up step (S11Q) of commanding the fuel control valve 16 to start fuel supply to the gas turbine 10 and commanding the fuel control valve 16 on a flow rate of fuel to be supplied to the gas turbine 10 so that the output of the gas turbine 10 increases to a rated output, a steam admission step (S22) of, when the temperature of the steam detected by the thermometer 47 reaches or exceeds a predetermined temperature, commanding the steam control valve 22 to open so as to start steam supply to the steam turbine 30, a synchronization step (S26) of, when the rotational speed detected by the rotational speed meter reaches a rated rotational speed of the steam turbine 30, commanding the circuit breaker 38 to electrically connect the generator 37 to the power system 1, an ST generator output control step (S27) of, after the generator 37 is electrically connected to the power system 1, commanding the steam control valve 22 on a flow rate of the steam to flow into the steam turbine 30 so that the output detected by the output gauge 45 increases according to a target output change pattern, and a thermal stress estimation step (S23) of estimating thermal stress generated in the steam turbine 30 based on the temperature of the steam detected by the thermometer 47. In the ST generator output control step (S27), when the thermal stress estimated in the thermal stress estimation step (S23) reaches or exceeds a predetermined value, the flow rate of the steam to flow into the steam turbine 30 is commanded to the steam control valve 22 so that a change in the output detected by the output gauge 45 is smaller than a change indicated by the target output change pattern.

By executing the start-up control program in this aspect by the computer, as in the method for starting up a combined cycle plant in the first aspect, the time required for the gas turbine output to reach the rated output can be shorter than when the gas turbine output is maintained at the low output for the predetermined time, while suppressing the thermal stress generated in the steam turbine 30.

INDUSTRIAL APPLICABILITY

According to one aspect of the present disclosure, the gas turbine output can be brought to the rated output in a short period of time while suppressing the thermal stress generated in the steam turbine.

REFERENCE SIGNS LIST

1: Power system
G: Gas turbine installation
Ga: First gas turbine installation
Gb: Second gas turbine installation
10: Gas turbine
10a: First gas turbine
10b: Second gas turbine
11: Compressor
12: Turbine
13: Gas turbine rotor
14: Combustor
15: Fuel line
16: Fuel control valve
17: GT generator 17a: First GT generator
17b: Second GT generator
18: GT circuit breaker
18a: First GT circuit breaker
18b: Second GT circuit breaker
19: Power line
S, Sa: Steam turbine installation
20: Waste heat recovery boiler
20a: First waste heat recovery boiler
20b: Second waste heat recovery boiler
21: Main steam line
21a: First main steam line
21b: Second main steam line
21c: Shared main steam line
21ad: First main steam dedicated line
21bd: Second main steam dedicated line
22: Steam control valve
22a: Shut-off valve
22b: Control valve
23: Bypass line
24: Bypass valve
25: Flue gas duct
26: Desuperheater
26a: First desuperheater
26b: Second desuperheater
26s: Spray
26v: Spray amount control valve
28a: First switching valve
28b: Second switching valve
29: Stack
29a: First stack
29b: Second stack
30: Steam turbine
33: Steam turbine rotor
34: Condenser
35: Feedwater pump
36: Feedwater line
37: ST Generator
38: ST circuit breaker
39: Power line
41: GT output gauge
42: GT rotational speed meter
45: ST generator output gauge
46: ST rotational speed meter
47: Thermometer
48: Pressure gauge
50, 50a: Control device
51: Manual input device
52: Display device
53: Input/output interface
54: Device interface
55: Communication interface
56: Storage/playback device
57: Memory
58: Auxiliary storage device
58p: Control program
58pa: Start-up control program
60: CPU
60g: Start-up control unit for gas turbine installation
61: GT start-up mode reception unit
62: GT start-up fuel control unit
63: GT synchronization command unit
60s: Start-up control unit for steam turbine installation
71: ST generator output control unit
72: Steam pressure control unit
73: ST bypass steam pressure control unit
74: ST synchronization command unit
75: Steam temperature control unit
76: Steam admission command unit
77: Steam supply stop command unit
78: Thermal stress estimating unit
79: Thermal stress detection unit

The invention claimed is:

1. A method for starting up a combined cycle plant including a gas turbine configured to be driven by fuel supply, a waste heat recovery boiler configured to generate steam by using heat from exhaust gas exhausted from the gas turbine, a steam turbine configured to be driven by the steam from the waste heat recovery boiler, a condenser configured to return the steam exhausted from the steam turbine to water, and a generator configured to generate electricity by drive of the steam turbine, the method comprising:

a gas turbine start-up step of increasing an output of the gas turbine to a rated output by supplying fuel to the gas turbine;

a steam admission step of, when a temperature of the steam from the waste heat recovery boiler reaches or exceeds a predetermined temperature, starting steam supply to the steam turbine;

a synchronization step of, after the steam admission step, when a rotational speed of the steam turbine reaches a rated rotational speed, synchronizing the generator to a power system;

an ST generator output control step of, after the generator is synchronized, controlling a flow rate of the steam flowing into the steam turbine so that an output of the generator increases according to a target output change pattern; and a thermal stress estimation step of estimating a thermal stress generated in the steam turbine based on a temperature of the steam flowing into the steam turbine, wherein in the ST generator output control step, when the thermal stress estimated in the thermal stress estimation step reaches or exceeds a predetermined first thermal stress, the flow rate of the steam flowing into the steam turbine is controlled so that a change in the output of the generator is smaller than a change indicated by the target output change pattern.

2. The method for starting up a combined cycle plant according to claim 1, wherein in the ST generator output control step, when the thermal stress estimated in the thermal stress estimation step reaches or exceeds the predetermined first thermal stress, the flow rate of the steam flowing into the steam turbine is controlled so that the output of the generator is temporarily maintained.

3. The method for starting up a combined cycle plant according to claim 1, the method further comprising:

an ST bypass steam pressure control step of, when a pressure of the steam flowing into the steam turbine reaches or exceeds a predetermined value, sending some of the steam from the waste heat recovery boiler to the condenser without supplying the some of the steam to the steam turbine.

4. The method for starting up a combined cycle plant according to claim 1, the method further comprising:

a steam temperature control step of controlling the temperature of the steam from the waste heat recovery boiler so that the temperature of the steam flowing into the steam turbine does not exceed a predetermined temperature.

5. The method for starting up a combined cycle plant according to claim 1, the method further comprising:

a steam supply stop step of, when the thermal stress estimated in the thermal stress estimation step reaches or exceeds a predetermined second thermal stress during a period from start of the steam supply to the steam turbine to execution of the synchronization step, stopping the steam supply to the steam turbine.

6. The method for starting up a combined cycle plant according to claim 1, wherein
the target output change pattern used in the ST generator output control step is set so that the thermal stress generated in the steam turbine does not reach the predetermined first thermal stress.

7. The method for starting up a combined cycle plant according to claim 1, the method further comprising:
a thermal stress detection step of detecting whether the thermal stress has reached a stable state in which an amount of change per unit time of the thermal stress estimated in the thermal stress estimation step is smaller than a predetermined amount of change and the thermal stress is smaller than the predetermined first thermal stress; and
a steam pressure control step of, after the ST generator output control step is completed by detecting that the thermal stress has reached the stable state in the thermal stress detection step, controlling the pressure of the steam flowing into the steam turbine so that the pressure of the steam flowing into the steam turbine is maintained within a predetermined range.

8. The method for starting up a combined cycle plant according to claim 1, wherein
the gas turbine start-up step is a GT rapid start-up step of increasing the output of the gas turbine to a rated output regardless of a state of the steam turbine.

9. The method for starting up a combined cycle plant according to claim 8, the method further comprising:
a GT start-up mode reception step of receiving a mode indicating whether to rapidly start up the gas turbine, wherein
when a GT rapid start-up mode for rapidly starting up the gas turbine is received in the GT start-up mode reception step, the GT rapid start-up step, the steam admission step, the synchronization step, the ST generator output control step, and the thermal stress estimation step are performed.

10. The method for starting up a combined cycle plant according to claim 9, further comprising:
a GT normal start-up step of, when a GT normal start-up mode in which the gas turbine is not started rapidly is received in the GT start-up mode reception step, increasing the output of the gas turbine to a rated output by supplying fuel to the gas turbine;
a steam admission step of, when a temperature of the steam from the waste heat recovery boiler reaches or exceeds a predetermined temperature, starting steam supply to the steam turbine;
a synchronization step of, after the steam admission step, when a rotational speed of the steam turbine reaches a rated rotational speed, synchronizing the generator to a power system; and
a steam pressure control step of, after the generator is synchronized, controlling a pressure of the steam flowing into the steam turbine so that the pressure of the steam flowing into the steam turbine increases according to a target pressure change pattern, wherein
in the GT normal start-up step, a flow rate of the fuel to be supplied to the gas turbine is adjusted before the output of the gas turbine reaches the rated output, so as to temporarily maintain the output of the gas turbine at a predetermined low output lower than the rated output.

11. The method for starting up a combined cycle plant according to claim 10, wherein:
when the GT normal start-up mode in which the gas turbine is not started rapidly is received in the GT start-up mode reception step, the thermal stress estimation step is performed, and
when the thermal stress estimated in the thermal stress estimation step reaches or exceeds a predetermined thermal stress in the GT normal start-up step, the flow rate of the fuel to be supplied to the gas turbine is temporarily reduced so that the output of the gas turbine is temporarily reduced.

12. The method for starting up a combined cycle plant according to claim 8, wherein
the GT rapid start-up step ends before the steam admission step.

13. A combined cycle plant comprising:
a gas turbine configured to be driven by fuel supply;
a waste heat recovery boiler configured to generate steam by using heat from exhaust gas exhausted from the gas turbine;
a steam turbine configured to be driven by the steam from the waste heat recovery boiler;
a condenser configured to return the steam exhausted from the steam turbine to water;
a generator configured to generate electricity by drive of the steam turbine;
a circuit breaker configured to electrically connect the generator to a power system in response to an external command and to electrically disconnect the generator from the power system in response to an external command;
a fuel control valve configured to adjust a flow rate of fuel to be supplied to the gas turbine;
a main steam line configured to guide the steam from the waste heat recovery boiler to the steam turbine;
a steam control valve provided in the main steam line and configured to adjust a flow rate of the steam flowing into the steam turbine;
a thermometer provided in the main steam line closer to the waste heat recovery boiler than the steam control valve and configured to detect a temperature of the steam flowing through the main steam line;
a rotational speed meter configured to detect a rotational speed of the steam turbine;
an output gauge configured to detect an output that is an amount of power generated by the generator; and
a control device, wherein
the control device includes
a start-up fuel control unit configured to command the fuel control valve to start fuel supply to the gas turbine and command the fuel control valve on a flow rate of fuel to be supplied to the gas turbine so that the output of the gas turbine increases to a rated output,
a steam admission command unit configured to command the steam control valve to open so as to start steam supply to the steam turbine when the temperature of the steam detected by the thermometer reaches or exceeds a predetermined temperature,
a synchronization command unit configured to command the circuit breaker to electrically connect the generator to the power system when the rotational speed detected by the rotational speed meter reaches a rated rotational speed of the steam turbine, an ST generator output control unit configured to command the steam control valve on a flow rate of the steam to flow into the steam turbine after the generator is electrically connected to the power system so that the output detected by the output gauge increases according to a target output change pattern, and a thermal stress estimating unit configured to estimate thermal stress generated in the steam turbine based on the temperature of the steam detected by the thermometer, and when the thermal stress estimated by the thermal stress estimating unit reaches or exceeds a predetermined value, the ST generator output control unit commands the steam control valve on the flow rate of the steam to flow into the steam turbine so that a change in the output detected by the output gauge is smaller than a change indicated by the target output change pattern.

14. The combined cycle plant according to claim 13, further comprising:

a pressure gauge provided in the main steam line closer to the waste heat recovery boiler than the steam control valve and configured to detect a pressure of the steam flowing through the main steam line;

a bypass line extending from a position in the main steam line closer to the waste heat recovery boiler than a position where the steam control valve is provided, and configured to guide the steam from the waste heat recovery boiler to the condenser; and a bypass valve provided in the bypass line and configured to adjust a flow rate of the steam flowing through the bypass line, wherein the control device includes an ST bypass steam pressure control unit configured to command the bypass valve to open when the pressure of the steam detected by the pressure gauge reaches or exceeds a predetermined value.

15. The combined cycle plant according to claim 13, further comprising:

a desuperheater configured to adjust the temperature of the steam flowing into the steam turbine at a position in the main steam line closer to the waste heat recovery boiler than a position where the steam control valve is provided, wherein the control device includes a steam temperature control unit configured to command the desuperheater so that the temperature of the steam detected by the thermometer does not exceed a predetermined temperature.

16. A start-up control program for a combined cycle plant, the combined cycle plant including a gas turbine configured to be driven by fuel supply, a waste heat recovery boiler configured to generate steam by using heat from exhaust gas exhausted from the gas turbine, a steam turbine configured to be driven by the steam from the waste heat recovery boiler, a condenser configured to return the steam exhausted from the steam turbine to water, a generator configured to generate electricity by drive of the steam turbine, a circuit breaker configured to electrically connect the generator to a power system in response to an external command and to electrically disconnect the generator from the power system in response to an external command, a fuel control valve configured to adjust a flow rate of fuel to be supplied to the gas turbine, a main steam line configured to guide the steam from the waste heat recovery boiler to the steam turbine, a steam control valve provided in the main steam line and configured to adjust a flow rate of the steam flowing into the steam turbine, a thermometer provided in the main steam line closer to the waste heat recovery boiler than the steam control valve and configured to detect a temperature of the steam flowing through the main steam line, a rotational speed meter configured to detect a rotational speed of the steam turbine, and an output gauge configured to detect an output that is an amount of power generated by the generator, the start-up control program for the combined cycle plant causing a computer to execute:

a gas turbine start-up step of commanding the fuel control valve to start fuel supply to the gas turbine and commanding the fuel control valve on a flow rate of fuel to be supplied to the gas turbine so that the output of the gas turbine increases to a rated output;

a steam admission step of, when the temperature of the steam detected by the thermometer reaches or exceeds a predetermined temperature, commanding the steam control valve to open so as to start steam supply to the steam turbine;

a synchronization step of, when the rotational speed detected by the rotational speed meter reaches a rated rotational speed of the steam turbine, commanding the circuit breaker to electrically connect the generator to the power system;

an ST generator output control step of, after the generator is electrically connected to the power system, commanding the steam control valve on a flow rate of the steam to flow into the steam turbine so that the output detected by the output gauge increases according to a target output change pattern; and a thermal stress estimation step of estimating thermal stress generated in the steam turbine based on the temperature of the steam detected by the thermometer, wherein in the ST generator output control step, when the thermal stress estimated in the thermal stress estimation step reaches or exceeds a predetermined value, the flow rate of the steam to flow into the steam turbine is commanded to the steam control valve so that the change in the output detected by the output gauge is smaller than a change indicated by the target output change pattern.

* * * * *